US005280577A

United States Patent [19]

Trevett et al.

[11] Patent Number: 5,280,577

[45] Date of Patent: Jan. 18, 1994

[54] CHARACTER GENERATION USING GRAPHICAL PRIMITIVES

[75] Inventors: Neil F. Trevett, Kingston upon Thames; Malcolm E. Wilson, Bridport; Sarah E. Lloyd, Kingston upon Thames, all of England

[73] Assignee: E. I. Du Pont de Nemours & Co., Inc., Wilmington, Del.

[21] Appl. No.: 948,061

[22] Filed: Sep. 21, 1992

Related U.S. Application Data

[63] Continuation of Ser. No. 758,452, Sep. 6, 1991, abandoned, which is a continuation of Ser. No. 563,799, Aug. 6, 1990, abandoned, which is a continuation of Ser. No. 286,071, Dec. 19, 1988, abandoned.

[30] Foreign Application Priority Data

Jan. 19, 1988 [GB] United Kingdom ................ 8801125

[51] Int. Cl.[5] ................................ G06F 15/62

[52] U.S. Cl. ............................ 395/150; 345/143

[58] Field of Search ........................ 395/150, 151; 382/44–48; 340/709, 721, 723, 735, 739, 751, 752

[56] References Cited

U.S. PATENT DOCUMENTS 3,952,297 4/1976 Stauffer et al. ............ 340/324 AD
4,029,947 6/1977 Evans et al. .................... 235/151
4,131,883 12/1978 Lundstrom ............... 340/324 AD
4,195,338 3/1980 Freeman ...................... 340/739 X
4,272,808 6/1981 Hartwig ........................ 364/718
4,298,945 11/1981 Kyte et al. ..................... 364/523
4,346,377 8/1982 Green ............................ 340/731
4,360,884 11/1982 Okada et al. .................. 364/521
4,384,338 5/1983 Bennett ......................... 364/522
4,396,989 8/1983 Fleming et al. ................ 364/521
4,529,978 7/1985 Rupp ............................. 340/727
4,533,911 8/1985 Finegold ....................... 340/727
4,545,069 10/1985 Kermisch ....................... 382/46
4,553,214 11/1985 Dettmer ........................ 364/521
4,595,996 6/1986 Morley et al. .................. 364/900
4,658,248 4/1987 Yu ................................. 340/739
4,662,546 5/1987 Sfarti et al. .................. 340/748 X
4,665,555 5/1987 Alker et al. .................. 340/724 X
4,675,830 6/1987 Hawkins ........................ 364/518
4,680,720 7/1987 Yoshii et al. .................. 364/521
4,686,632 8/1987 Schrieber ...................... 395/150
4,816,814 3/1989 Lumelsky ..................... 340/723 X

FOREIGN PATENT DOCUMENTS 0030635 6/1981 European Pat. Off. .
0095536 12/1982 European Pat. Off. .
0215664 3/1987 European Pat. Off. .
2296898 7/1976 France .
79/01166 12/1979 PCT Int'l Appl. .
86/05905 10/1986 PCT Int'l Appl. .
2050019 12/1980 United Kingdom .
2098836 11/1982 United Kingdom .
2105503 3/1983 United Kingdom .
2186163 8/1987 United Kingdom .

*Primary Examiner*—Heather R. Herndon
*Attorney, Agent, or Firm*—Sterne, Kessler, Goldstein & Fox

[57] ABSTRACT

A system and method stores fonts and generates characters. Instead of the fonts containing bit maps, the storage area (116) for each character contains the addresses (GPCR Addresses) of instructions to be used to form the character, and the required parameters for those instructions. In a preferred embodiment, a lookup table (114) for the font contains, for each character, the address of the code to start executing and details of how much more information is stored for this character and where to find it. For each character, the stored information includes addresses of microcode instructions (126) followed by the required number of parameters to define the actions necessary for character generation.

29 Claims, 8 Drawing Sheets

FIG.2.

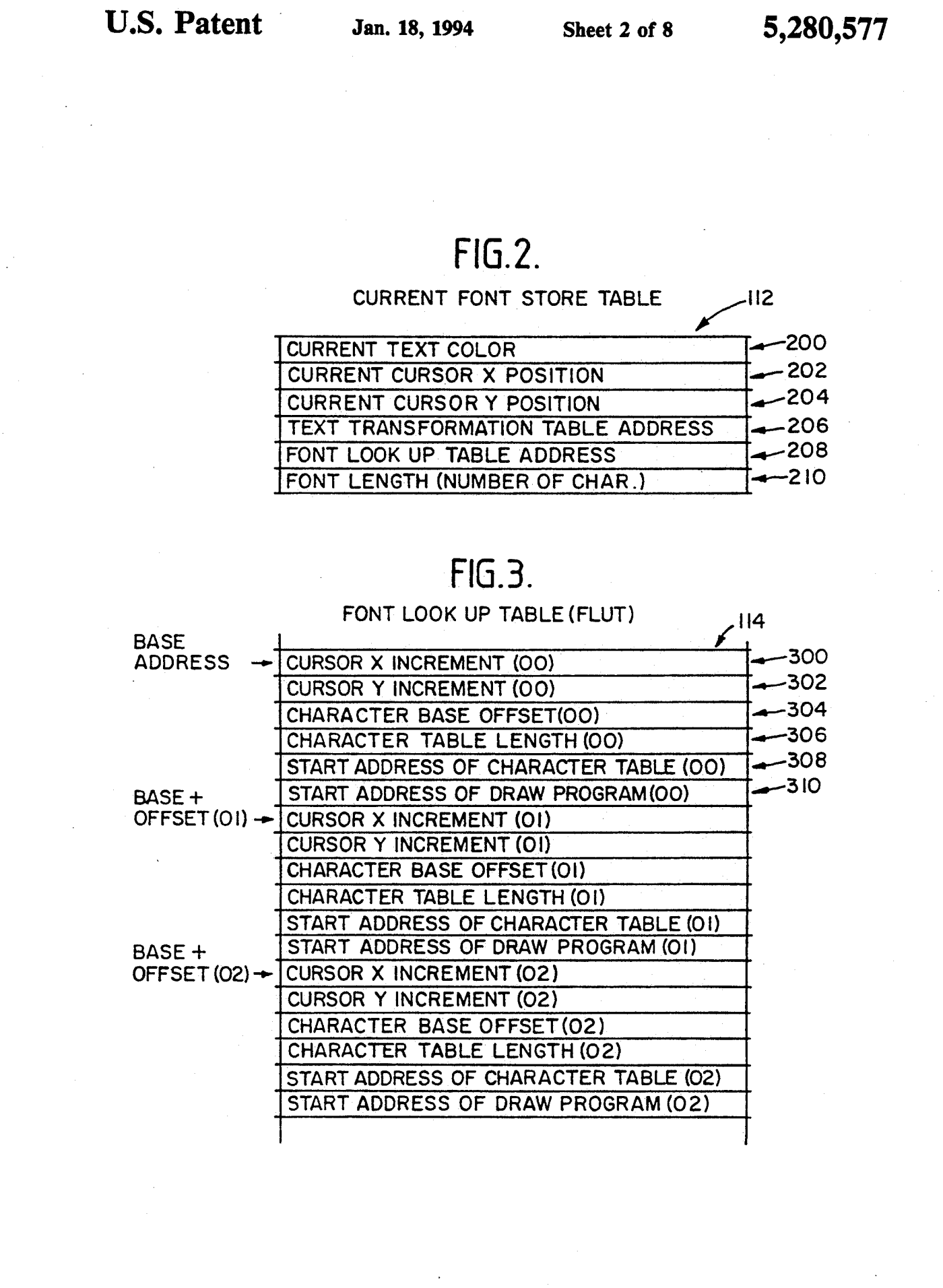

CURRENT FONT STORE TABLE 112

| | |
|---|---|
| CURRENT TEXT COLOR | 200 |
| CURRENT CURSOR X POSITION | 202 |
| CURRENT CURSOR Y POSITION | 204 |
| TEXT TRANSFORMATION TABLE ADDRESS | 206 |
| FONT LOOK UP TABLE ADDRESS | 208 |
| FONT LENGTH (NUMBER OF CHAR.) | 210 |

FIG.3.

FONT LOOK UP TABLE (FLUT) 114

| | | |
|---|---|---|
| BASE ADDRESS → | CURSOR X INCREMENT (00) | 300 |
| | CURSOR Y INCREMENT (00) | 302 |
| | CHARACTER BASE OFFSET(00) | 304 |
| | CHARACTER TABLE LENGTH (00) | 306 |
| | START ADDRESS OF CHARACTER TABLE (00) | 308 |
| | START ADDRESS OF DRAW PROGRAM(00) | 310 |
| BASE + OFFSET (01) → | CURSOR X INCREMENT (01) | |
| | CURSOR Y INCREMENT (01) | |
| | CHARACTER BASE OFFSET (01) | |
| | CHARACTER TABLE LENGTH (01) | |
| | START ADDRESS OF CHARACTER TABLE (01) | |
| | START ADDRESS OF DRAW PROGRAM (01) | |
| BASE + OFFSET (02) → | CURSOR X INCREMENT (02) | |
| | CURSOR Y INCREMENT (02) | |
| | CHARACTER BASE OFFSET(02) | |
| | CHARACTER TABLE LENGTH (02) | |
| | START ADDRESS OF CHARACTER TABLE (02) | |
| | START ADDRESS OF DRAW PROGRAM (02) | |

FIG. 5.

EXAMPLE OF CHARACTER TABLE FOR THE LETTER "B"

500

| | |
|---|---|
| POINTER TO "LINE" GPCR | 502 |
| X START COORDINATE | 504 |
| Y START COORDINATE | |
| X FINISH COORDINATE | |
| Y FINISH COORDINATE | |
| POINTER TO "ARC" GPCR | 506 |
| X CENTER COORDINATE | 510 |
| Y CENTER COORDINATE | |
| RADIUS | 512 |
| START POINT X | 514 |
| START POINT Y | |
| END POINT X | 516 |
| END POINT Y | |
| POINTER TO "ARC" GPCR | 508 |
| X CENTER COORDINATE | |
| Y CENTER COORDINATE | |
| RADIUS | |
| START POINT X | |
| START POINT Y | |
| END POINT X | |
| END POINT Y | |
| POINTER TO "END" OF CHARACTER PROGRAM | |

TEXT TRANSFORMATION TABLE 118

600

| |
|---|
| DATA FOR ARRAY LOCATION 0.0 |
| DATA FOR ARRAY LOCATION 0.1 |
| DATA FOR ARRAY LOCATION 0.2 |
| DATA FOR ARRAY LOCATION 1.0 |
| DATA FOR ARRAY LOCATION 1..1 |
| DATA FOR ARRAY LOCATION 1.2 |
| DATA FOR ARRAY LOCATION 2.0 |
| DATA FOR ARRAY LOCATION 2.1 |
| DATA FOR ARRAY LOCATION 2.2 |

CHARACTER GENERATION USING GRAPHICAL PRIMITIVES

This application is a continuation of application Ser. No. 07/758,452, filed Sep. 6, 1991, now abandoned which is a continuation of application Ser. No. 07/563,799, filed Aug. 6, 1990, now abandoned which is continuation of application Ser. No. 07/286,071, filed Dec. 19, 1988, now abandoned.

BACKGROUND OF THE INVENTION

Field of the Invention

This invention relates to the generation of characters, and more particularly, but not exclusively, to the generation and display of characters on digital computer systems using mapped graphic display devices.

Related Art

There are presently a variety of methods available for generating characters on computer systems with mapped graphic display devices. A character font is a complete set of characters of a given size and face. Some computers use only one font. Other computers allow the operator or programmer to choose from a selection of fonts. Further, the advent of mapped graphic displays allows computers to generate and display a variety of font types within a single image.

The term "mapped" refers to the method of storing and accessing data in the display memory. For example, in a bit mapped display the video screen may be thought of as an array of pixels. If a screen is 100 pixels long by 100 pixels wide, there will be 10,000 locations in memory corresponding to the pixels on the screen. If each location of memory is made to correspond to a particular pixel position on the display screen, the display is said to be "mapped".

One common way of drawing characters is through the use of a character bit map. This character bit map process involves storing patterns representing the type, size and face of each character in a section of memory (sometimes referred to as "character memory"). Each character displayed or printed may be thought of as existing within a two dimensional matrix of pixels (sometimes referred to as a "cell"). The bit pattern representing the cell may be stored in a character memory. The generation of a character font typically involves the storage of a collection of bit patterns in character memory. The collection usually includes alphabetic, numeric and punctuation characters as well as certain commonly used symbols.

Once the character "bit maps" have been stored in "character memory", they must be transferred to the screen in the desired order. In other words, there must be some way of using the bit map information to form a desired arrangement of characters which are observable as words, sentences or other structures. There are several known methods of accomplishing this transfer.

One of these methods uses a "block copy" operation to transfer bit maps from the character memory to the display. To transfer a character, the Central Processing Unit (CPU) reads the character's bit map from character memory. The CPU then writes the characters bit map to the display memory driver circuit which, in turn, transfers it to the display memory.

Another method for transferring bit map information includes using the display driver to directly retrieve character bit maps from memory. Using this method, the CPU passes a character output instruction and the starting address of the characters bit map to the display driver. The display driver then directly retrieves the bit map and writes it to the display memory.

A further method of transferring bit map information is through the use of a "pixel data manager" and "macro instructions". This method, as well as several other methods, are described in U.S. Pat. No. 4,622,546 to Sfarti et al..

All of the above-described methods share the fact that they use character bit maps as a necessary component of font generation. Generally, systems using character bit maps are burdened with several problems. One problem often encountered in character bit map devices is that the CPU may be required to perform a large number of memory access instructions in order to draw a given character. This burden may reduce system performance. The bit map method may also run into memory space limitations due to the fact that memory locations must be allocated for each font desired. Bit map methods also have an impediment to their flexibility in that, in many cases, any variations in a given character or in an entire font must be tediously created on a pixel-by-pixel basis.

The inherent limitations of bit mapped characters may also make it difficult or costly to perform operations such as scaling (changing the size of a character) and rotation (drawing a word, character string or character at an angle relative to the baseline). For example, when a bit map character is enlarged, the enlargement operation (typically the copying of pixels) may result in the character appearing with jagged edges. The storing of another font with larger bit maps circumvents this problem, but requires the use of more memory space. Further, the rotation of a bit mapped character may be made difficult due to the block copy operation and may require a significant number of calculations to accomplish.

It would be desirable to have a system and method for generating fonts that does not make use of bit mapped character storage. Further, it would be desirable to have a way of generating fonts that is fast, flexible and which can be used to generate a wide variety of fonts and accomplish transformations while using both memory space and CPU time in an efficient manner.

SUMMARY OF THE INVENTION

The present invention provides a system and method of storing fonts and generating characters. Instead of containing bit maps, the storage area for each character in the font contains the addresses of instructions to be used to form the character, and the required parameters for those instructions.

In one embodiment, a lookup table for the font contains, for each character, the address of the characters primitive table (the character table), details of how much more information is stored for this character in the character table and information about the characters base offset and cell size. The character table for each character includes addresses of microcode instructions followed by the parameters necessary for character generation.

Any number of actions can be defined to draw a character. For example, draw line, draw spline curve, draw circle, draw ellipse, draw rectangle, draw single pixel and flood fill. It should be understood that any geometric figure can be drawn as a primitive. These actions, called Graphical Primitives, may be called upon to occur in any sequence and with any amount of redundancy. The present invention therefore allows the programmer or operator the ability to design and use a wide variety of fonts and to dynamically modify these fonts with relatively little programming effort. Further, by using graphical primitives, the present invention makes efficient use of memory space and CPU time.

The use of graphic primitives in the generation and storage of fonts has several advantages over bit map systems. These advantages are particularly significant in the areas of scaling and rotation. Also, the use of graphic primitives makes the generation of characters orientation and size independent. For example, if a character requires that a straight line be drawn, only the relative start points and end points need be provided. Rotating a line only requires giving the line drawing operation different line endpoint parameters. This makes rotation of a character or of a character string easy to accomplish. Further, text is easily scaled. The same primitive used to draw a line may be used to draw a longer or shorter line by merely varying the endpoints.

The present invention takes advantage of two dimensional transformation techniques to make transformation operations such as scaling (changing the size of a character) and rotation (drawing a word, character string or character at an angle) an easy matter. A change in character size or rotation merely requires manipulating the parameters supplied to the primitives during the draw operation. Advantageously, the present invention does not require any changes to the primitives, the parameters themselves, or to sequence of primitive execution for a given character. In the preferred embodiment, the invention utilizes the known technique of two dimensional transformation by matrix multiplication to accomplish these transformation functions.

The present invention eliminates the need to maintain several font bit maps in memory and actually provides for the creation of the character as it is drawn. Advantageously, this allows for the storage and generation of several fonts based on a single collection of stored graphic primitives and commands for ordering their sequence of execution. This also allows factors such as size, location and rotation to be easily and dynamically modifiable through manipulation of the parameters passed to the graphic primitives. Further, the present invention typically provides, relative to bit mapped systems, efficient use of memory for the storage of a given number of fonts (i.e., more fonts in less memory than bit mapped systems) and for reduced CPU overhead in the generation and drawing of fonts.

DESCRIPTION OF THE DRAWINGS

The invention may be better understood by reference to the following drawings:

FIG. 2 is a memory map of a Current Font Store Table.

FIG. 3 is a memory map of a Font Look Up Table.

FIG. 5 is an example of Character Table entries for the letter "B".

DETAILED DESCRIPTION OF THE PREFERRED EMBODIMENT

The preferred embodiment of the present invention uses a computer-based microcoded program running on a graphics processor which uses graphical primitives to store fonts and to generate characters. It should be understood that while it is preferred, (for speed purposes), that the operations described herein be implemented at the microinstruction level, these operations may be easily implemented in any program language at the micro or macro level. Further, the invention could also be embodied in hardware or through the use of programmable logic circuitry.

An overview of the present invention will first be described by reference to FIG. 1. The present invention provides a system and method of storing fonts and generating characters. Instead of containing bit maps, the storage area for each character in the font contains the addresses of instructions to be used to form the character, and the required parameters for those instructions. The invention makes use of memory tables, which store information used in the generation of characters, and programs which read and make use of that information. These programs and tables allow the system to obtain character code information from the CPU or I/O device (e.g., keyboard), and to perform transformation operations on the character data as the character is being generated on the display device.

Figure 1:
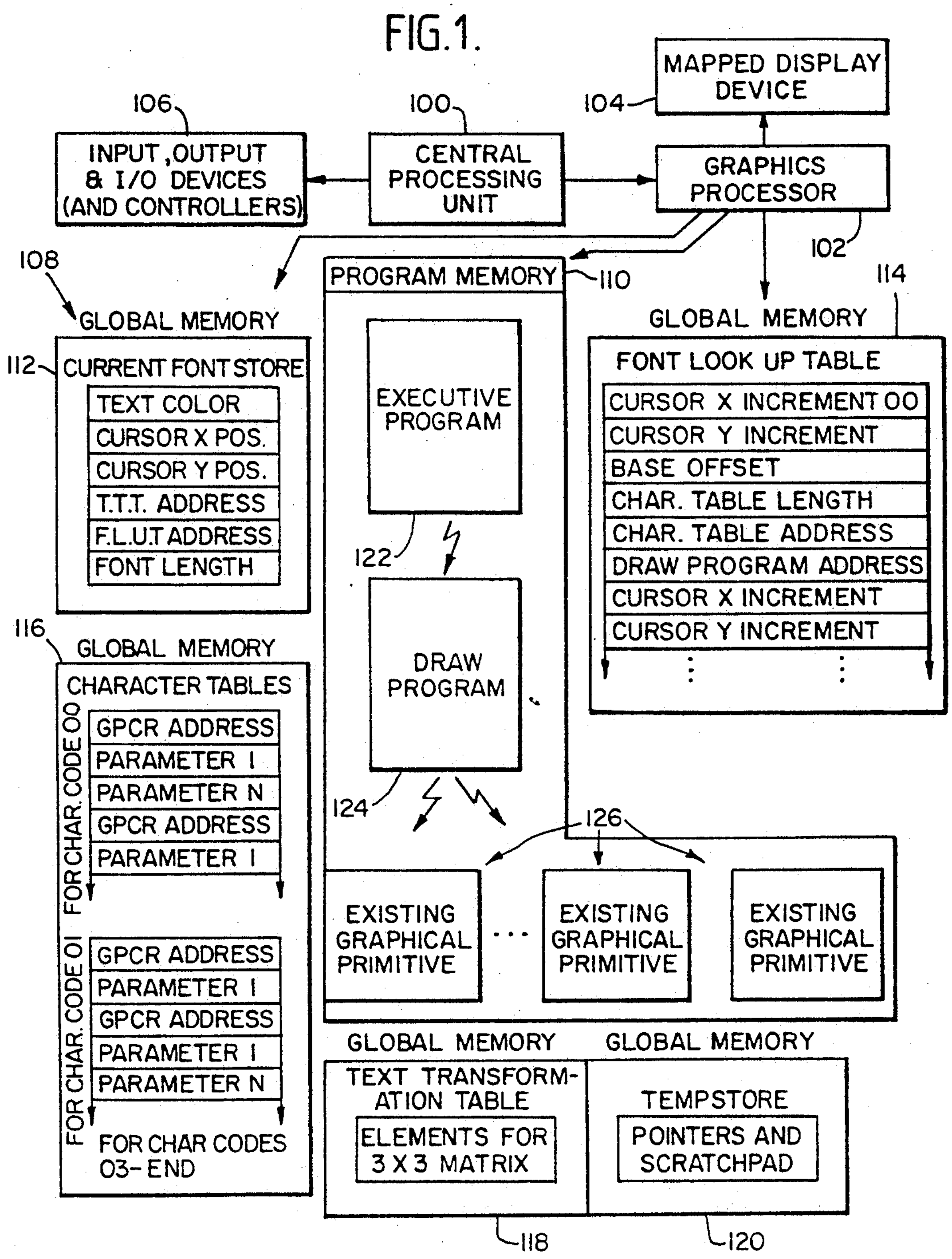
FIG. 1 is a general overview of a system of the present invention.

Referring now to FIG. 1, it may be seen that the system of the present invention preferably includes a CPU 100, a graphics processor 102 (i.e., a device that processes data in a memory for display), a mapped display device 104 (such as high resolution bit mapped display), I/O devices and controllers 106 (keyboards, disks, printers, etc.), a program memory 110, and a global memory 108 (for storing tables, pointers, scratchpad or any other information used by the programs). It should be understood that Global and Program memories 108 and 110, respectively, may be separate physical memories or may be defined areas within a single memory. It is preferred that both Global and Program memory be high speed memories such as static RAM (SRAM). The display device 104 will typically be driven by the graphics processor 102. The remaining components (listed above) will typically pass data via a common bus under control of an interrupt and arbitration scheme. The techniques and hardware necessary to interconnect these components are well known by those skilled in the art. The operation and structure of graphics processors is further discussed in U.S. Pat. Nos. 4,642,625 to Tsunehiro et al., and 4,580,134 to Cambell et al., which are incorporated by reference herein in their entirety as if printed in full below.

In the preferred embodiment, the following tables are defined in global memory 108: Current Font Store Table (CFS) 112, which stores certain global information for use by an executive 122; a Font Look Up Table 114 (FLUT), which stores, for each character in the font, information concerning base offsets, cursor increments, and a pointer to specific information concerning how to draw that character; Character Tables 116, (one for each character in the font), which store pointers to programs which call graphics primitives 126 (GPCR's) and information to be used by those primitives; and a Text Transformation Table (TTT), 118 which contains information to be used in the transformation, (if any), of the character to be drawn (see FIG. 6 for a representation of the memory map of the text transformation table). Global memory 108, as shown in FIG. 1, also contains a Temporary Storage Area 120, which holds pointers used by the programs and acts as a scratchpad/Temporary Storage area.

The information within the tables is used by two programs which execute from program memory 110. These programs are the Executive Program 122 and Draw Program 124. The Executive Program 122 sets up the color register of the systems graphics controller 102 and collects, from the CPU 100 (which may be connected to an appropriate I/O device 106), information such as which and how many characters are to be drawn. For each character, the Executive 122 calculates the Font Look Up Table address where the information for the character is stored and then calls the Draw Program 124. The Draw Program 124 finds the proper character table for the character to be drawn, extracts the required parameters from the character table, and then calls routines (GPCR's) which transform the parameters and execute graphical primitives 126 necessary to draw the character on the mapped display device 104. In operation, the Draw Program 124 executes transformations and graphical primitives one at a time until the character is drawn. The operations of the Executive Program 122 and Draw Program 124 are described in greater detail within.

As used in this specification, the term "displayed" is used for convenience and is not intended to be a limitation on the type of device on which a character may appear. For example, a character may be made to appear on a printer, a crt or any other appropriate device. The term "character" refers to any shape or symbol used to convey information. For example, alpha-numerics, special characters, and arbitrarily chosen symbols for a given application.

The present invention will now be described in more specific detail. FIGS. 2 through 6 show the various tables which are used in the preferred embodiment of the present invention. In the preferred embodiment, these tables are stored in areas of Random Access Memory (RAM). It should be understood that these tables may also be stored elsewhere, for example in Read Only Memory (ROM) or in a storage device such as a hard disk or floppy.

FIG. 2 shows a memory map of the Current Font Store Table (CFST). This table contains global information for use by the Draw Program 124 and the Executive Program 122, including the current text color 200, cursor 'X' position 202, cursor 'Y' position 204, the Text Transformation Table (TTT) address 206, the Font Look Up Table (FLUT) address 208 for the font selected and the number of characters in the selected font 210. The Current Font Store Table 112 is initialized prior to entering the Executive Program 122 and the cursor X position and cursor Y position are updated as each character is displayed. The other information stored in the CFST 112 may also be changed in between the display of characters. It is preferred that each entry in the table be of equal size although it is possible to use entries of different sizes with some modification of the Executive Program 122. In one example tested by the inventors, the size of each entry was 16 bits (which was equal to the data word size of the computer utilized). It is contemplated that any word size sufficient to describe each entry would do just as well.

The FIG. 2 embodiment of the Current Font Store Table 112 contemplates that the tables of FIGS. 2 through 6 will be stored in a standard one dimensional memory (i.e. only one address is necessary to address any memory location). It should be understood, however, that the table of FIG. 2 may be easily modified to work with a two dimensional memory as well (i.e. where memory is addressed by 'X' and 'Y' coordinates). Where tables 3 through 6 are stored in such a two dimensional memory, the entry for the Font Look Up Table Address 208 is replaced with a FLUT 'X' address and a FLUT 'Y' address. Similarly, entries are added for the character table start and finish addresses so as to define the left and right boundaries of the two dimensional memory structure. Advantageously, similar modifications may be performed where data is stored in any memory or storage device requiring any given number of coordinates for data addressing (e.g. a multi headed disc). The contents of the tables of FIGS. 2 through 6 are not dependant on the type of storage device holding the Current Font Store Table 112.

FIG. 3 shows a memory map of the Font Look Up Table 114. The Font Look Up Table (FLUT) contains, for each character in the font, information including the cursor 'X' and 'Y' increments 300, 302 (i.e. the amount that the cursor position is updated by when a character is drawn), the base offset 304 (i.e. the amount that must be subtracted from the cursor 'Y' position to give correct alignment for characters descending below the baseline), the length of the Character Table 306 for the selected character (i.e. the number of data items required to generate that character) and the start address of the Character Table 308. The FLUT may also contain an entry for the Draw Program address 310 where it is desired to draw characters using more than one technique or program. Where the Character Tables 116 are stored in a two dimensional memory the Character Table address 308 will consist of an 'X' address entry and a 'Y' address entry. As stated above, modifications may be easily made for memories or storage devices requiring any number of address parameters.

Figure 4:
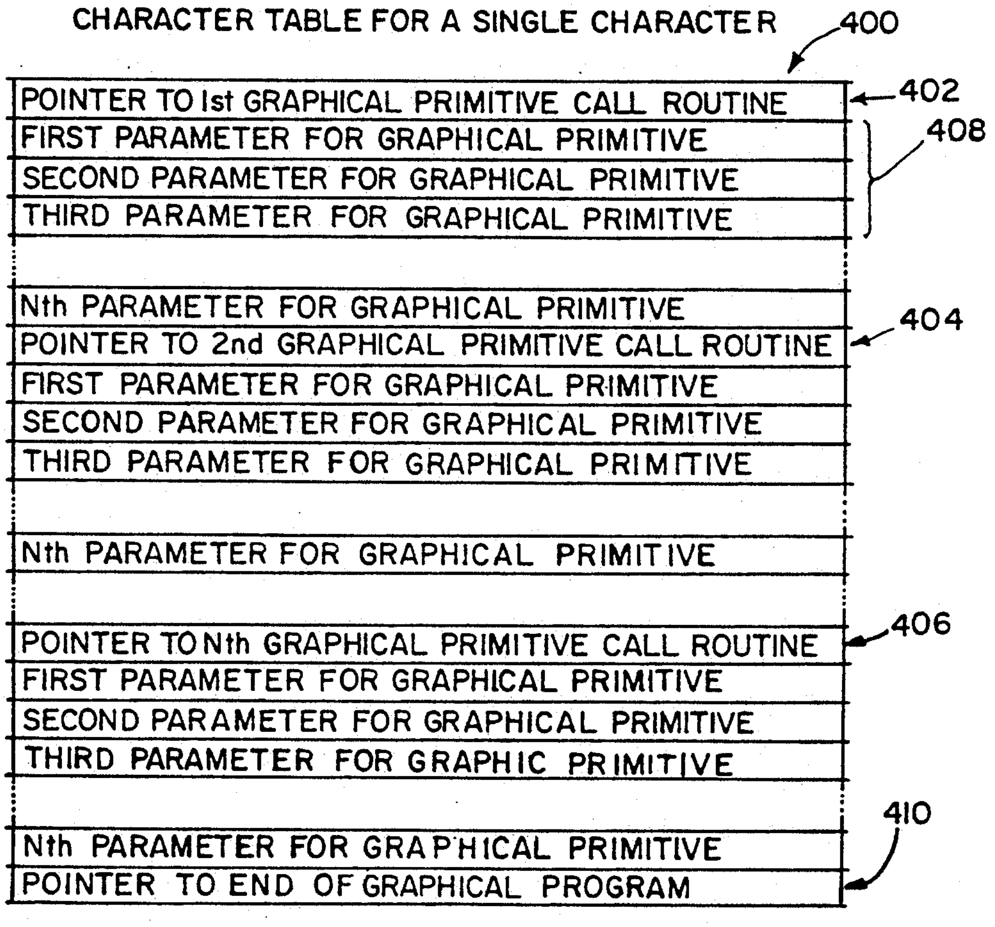
FIG. 4 is a memory map of a Character Table for a single character.

FIG. 4 shows a memory map of a Character Table 400 for a single character. Each character table 400 contains data identifying the graphical primitives which are to be executed to generate the character. This is accomplished by providing (in the character table) the addresses 402, 404, 406 of intermediate routines (Graphical Primitive Call Routines or GPCRs) which preprocess (such as, for example, transform and modify using the current cursor position) the parameters used in the execution of the graphical primitive and then cause the execution of the specified graphical primitive. Each GPCR address 402, 404, 406 is followed by a list of parameters 408 necessary to execute the associated primitive in the desired manner. The last entry in the Character Table is the "END OF CHARACTER" primitive address 410.

FIG. 5 shows an example of a character table structure for the letter "B". It can be seen that the letter "B" might be drawn using one straight line and two arcs. The Character Table structure for the letter "B" might therefore consist of the address 502 of a GPCR for a line primitive followed by starting point and ending point parameters 504, and, two entries 506, 508 with the address of the GPCR for arc primitives, each followed by center point 510, radius 512, start point 514 and end point 516 information.

It should be understood that there is one character table 400 for each character in the font. These tables may be contiguous for storage efficiency purposes but need not be for proper operation of the invention.

Advantageously, the use of GPCRs allow the programer to take advantage of the features of a given operating system or of a particular piece of hardware. For example, if an operating system already contains software to execute graphical primitives the GPCRs can be used to extract parameter information from the Character table and put it into a place where the existing graphical primitive software 126 knows to find it. It can then call the existing graphical primitive program. In one embodiment, the GPCRs are also used to gather data for and call a character transformation program.

The use of GPCRs also give the invention the flexibility to be used in systems where the primitive execution and/or character transformation functions are accomplished in hardware. In this embodiment, the GPCR's would extract and manipulate the parameter data as needed for a given piece of hardware and perform any other required interfacing functions. For example, where a systems graphics processor 102 has the ability to execute primitives directly, the GPCR's act as an interface between the Draw Program 124 and the hardware of the graphics processor 102. In this embodiment the graphics processor 102 will draw primitives so as to create characters under control of the Draw Program 124. It should be understood that where the application is appropriate the GCPR's may be eliminated and the addresses of the graphical primitives may be placed in the character tables 116 for direct execution.

The concept of Graphical Primitives is well known by those skilled in the art and is taught in the books "Computer Graphics" by Donald Hearn and Pauline Baker (published by Prentice-Hall, 1986), and "Fundamentals of Interactive Computer Graphics" by J. D. Foley & A. Van Dam (published by Addison Wesler, reprinted 1983). Both of these books are hereby incorporated by reference herein as if each were printed in full below.

Figures 6, 8:
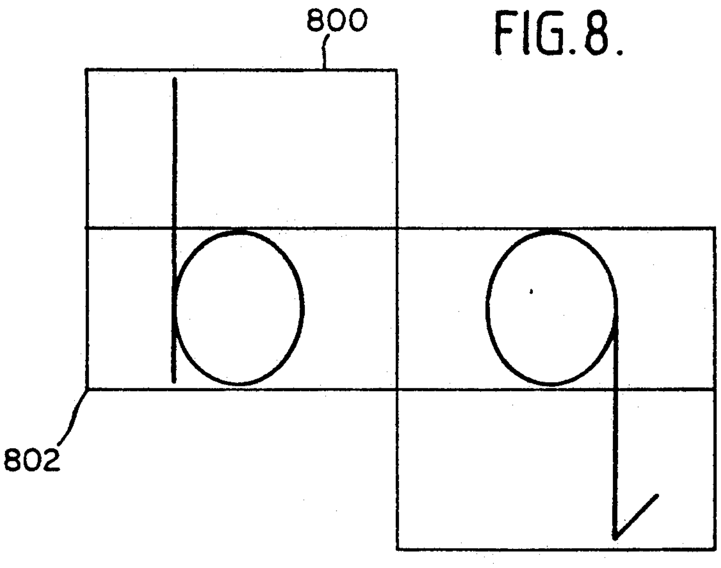
FIG. 6 is a memory map of a Text Transformation Table.
FIG. 8 is an example of primitive construction of the letter "q".
Figure 7:
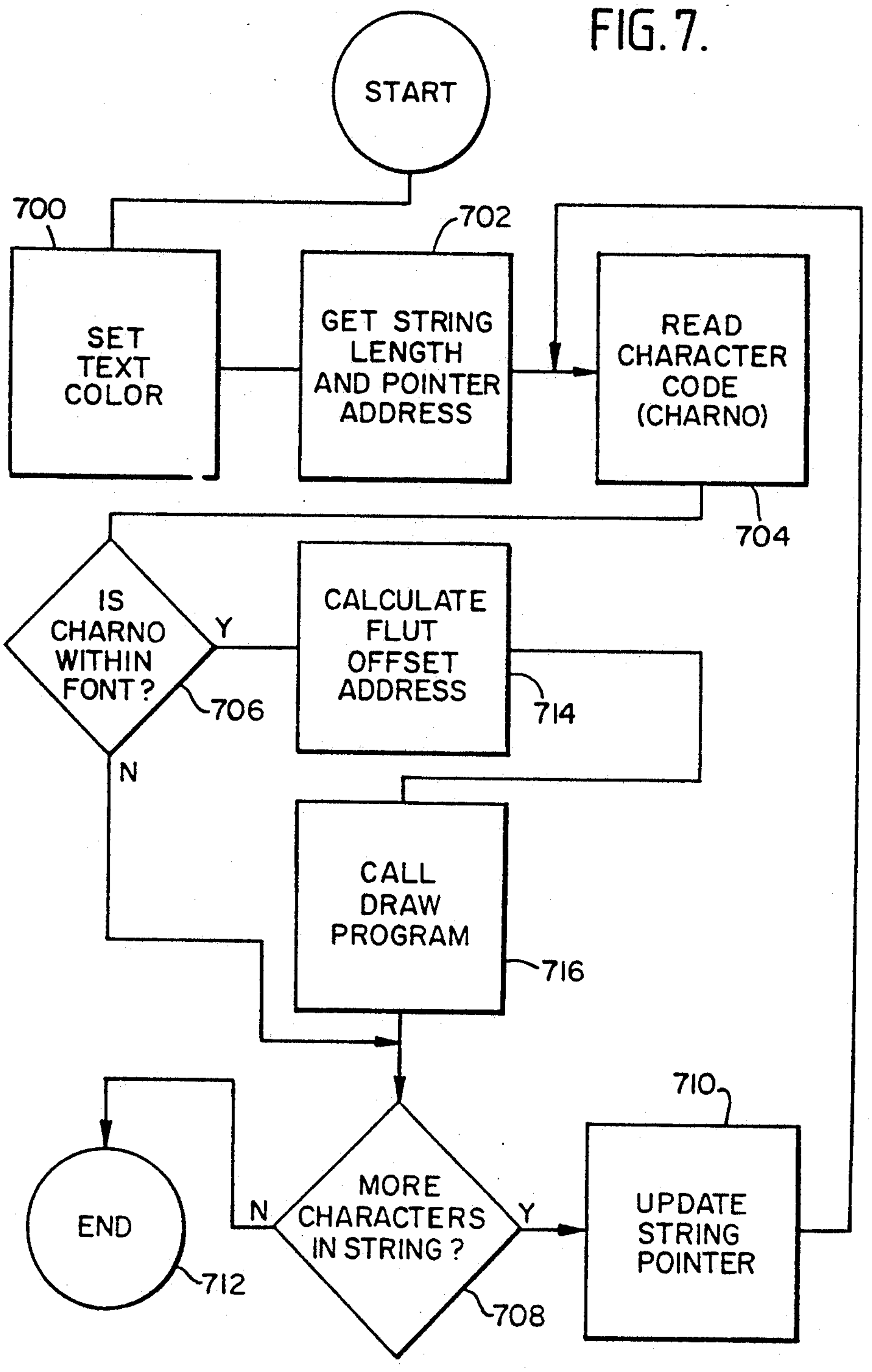
FIG. 7 is a flow chart of a Draw Executive.

FIG. 6 is a memory map of the Text Transformation Table 118. In the preferred embodiment the invention utilizes a 2×3 or 3×3 matrix to perform transformations on the characters to be generated. The Text Transformation Table 118 contains the data 600 used in this matrix. Transformation refers to manipulations such as rotation, scaling and translation and any combination thereof. The invention uses a technique sometimes referred to as "two dimensional transformation by matrix multiplication". Two dimensional transformation by matrix multiplication is essentially a method of transforming a point in a two dimensional plane by treating the X, Y coordinates of the point as two of the elements of a 3×1 matrix and multiplying that matrix by a 2×3 or 3 ×3 matrix. The 2×3 or 3×3 matrix values determine how the point is translated, rotated about an origin, and scaled relative to that origin. The result of the matrix multiplication contains the X and Y coordinates of the transformed point. Advantageously, the use of graphical primitives allows a character or string of characters to be transformed by applying this technique to the parameters for each primitive prior to the execution of the primitive itself. The technique of two dimensional transformation by matrix multiplication is known by those skilled in the art and is described in the book entitled "Principals of Interactive Computer Graphics", authors Newman & Sproul, published by McGraw Hill, second edition (printed 1979) which, in its entirety, is incorporated by reference herein as if printed in full below. Chapter 4 of this book is particularly pertinent.

The Text Transformation Table 118 may be filled before entering the Executive Program 122 and changed for each character. It may also be left intact for a stream of characters. It should be understood that the programer may change the transformation data 600 at any point desired.

The operation of the Character Generation system and method will now be explained by reference to FIG. 1 and FIGS. 7 through 11.

As has been explained, the invention utilizes a set of computer instructions which may be thought of as having two parts, an Executive Program 122 and a Draw Program 124. The operation of the Executive Program 122 will first be explained by reference to FIGS. 1 and 7.

First, as indicated by block 700, the Executive Program 122 sets the font color by reading it from the Current Font Store Table 112 and writing it into the color register of the computers graphics processor 102. This step may be accomplished elsewhere but is preferably accomplished in the Executive Program 122. Advantageously, setting the color at this point allows for individual strings or characters to be set with their own color. On monochrome systems this information may be omitted or used to set features such as inverse video. This information may be similarly used to provide color information to a printer or printer plotter where these devices are used.

Next, as indicated by block 702, the Executive Program 122 gets the number of characters in the string to be printed and the strings starting address (character address if only one character is to be displayed). It should be understood that character codes may be generated by the CPU 100 (shown in FIG. 1) or obtained from any appropriate input device (such as a keyboard) via the CPU 100. It should also be understood that the executive routine may be interrupt driven. The operation of the invention is unaffected by the origin of the character code.

The Executive then retrieves the first character (as indicated by block 704) and a determination is made, block 706, as to whether the character code is recognizable as being within one of the preprogrammed fonts. In the preferred embodiment this is accomplished by reading the number of characters in the font from the Current Font Store and determining whether the font is less than or equal to that number. This operation assumes that the character codes start at zero and run contiguously to the highest character code available for that font. If this assumption is incorrect or if another method is desired, the character may be compared with the valid character codes in the character look up table. If this is not sufficient, a separate character code table may be created or other known methods may be used.

If the character code is not recognized as being with a known font the next character in the string is obtained (indicated by blocks 708, 710, 704) or if no more characters are to be drawn the Executive is exited (blocks 708, 712). The program may easily be modified to set an error flag, print an error character or take any other desired action if the character is not recognized.

If the character code is recognized, it is used to develop an offset address for the fonts look up table (the FLUT offset address). In order to accomplish this the program reads the appropriate Font Look Up Table (FLUT) base address from the Current Font Store Table. Assuming that the character code read by the program was a value N, the program calculates the address of the Nth data structure from this FLUT base address. This calculation tells the program where to look for the information concerning a given character within the Font Look Up Table. The FLUT offset address is stored in a globally available memory area where the Draw Program (or any other program) can access it.

In the embodiment of the FLUT shown in FIG. 3 each character's data structure contains 6 entries. Therefore, if this table were used and the character code '02' was read the base address of the FLUT would need to be offset by 12 entries.

Next, as indicated by block 716, the executive calls the Draw Program 124 (which will be described in detail later). The executive gets the address of the Draw Program from the FLUT. Advantageously, this allows the executive to use more than one Draw Program where it is desired to generate a string of characters using more than one method. When the character has been drawn, control is returned to the executive. If the complete string has been printed the executive is exited. If there are more characters to be printed the executive retrieves the next character and repeats the sequence until the string has been processed.

The executive may keep track of the character to be printed through the use of a character string pointer. This pointer may be incremented every time a character is read and compared with the expected string length in order to determine when the last character has been processed. The executive may store this pointer and the FLUT offset address in global temporary storage (tempstore) 120 so that they may be used by the Draw Program 124 or any other program, routine or piece of hardware that may need them.

The character generation operation will now be described by reference to FIG. 1 and FIGS. 8 through 11.

Figure 9:
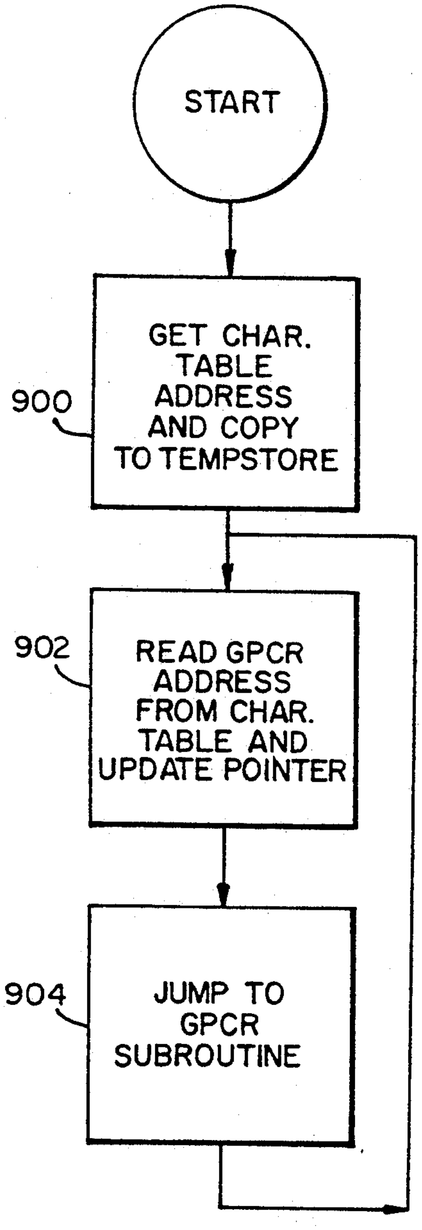
FIG. 9 is a flow chart of the executive common portion of the Draw Program.

As has been explained, the system draws characters on the display device 104 by executing primitives which interface with the systems graphics processor 102. The Draw Program 124 may be thought of as consisting of two portions. The first portion of the Draw Program 124 is used to orchestrate the execution of the graphical primitives. The graphical primitives are executed through the use of subroutines (GPCR's) which are described below. A flow chart of this first portion is shown in FIG. 9.

The second portion of the Draw Program comprises a collection of subroutines (Graphical Primitive Calls Routines) which call the appropriate transformation and graphical primitive routines and extract the appropriate parameters necessary to the execution of these functions. There is a GPCR for every primitive used to generate the font. These primitives may include operations such as line, spline curve, circle, rectangle, flood fill, ellipse, single pixel and End OF Character. It should be understood that any geometric figure can be drawn as a primitive. As has been previously explained, the parameters necessary to the transformation and execution of the primitives are found in the Transformation Table (FIG. 5) and the Character Table (FIG. 4).

As indicated by block 900, the Draw Program 124 first gets the appropriate Character Table address from the FLUT and copies the address to a globally accessible temporary storage area. This stored data is then used as the character table pointer. As indicated by block 902, the program then reads the address of the first GPCR in the character table, updates the character table pointer to the next entry and, as shown in block 904, jumps to the GPCR address. The GPCR's are preferably accessed as subroutine calls.

Figure 10:
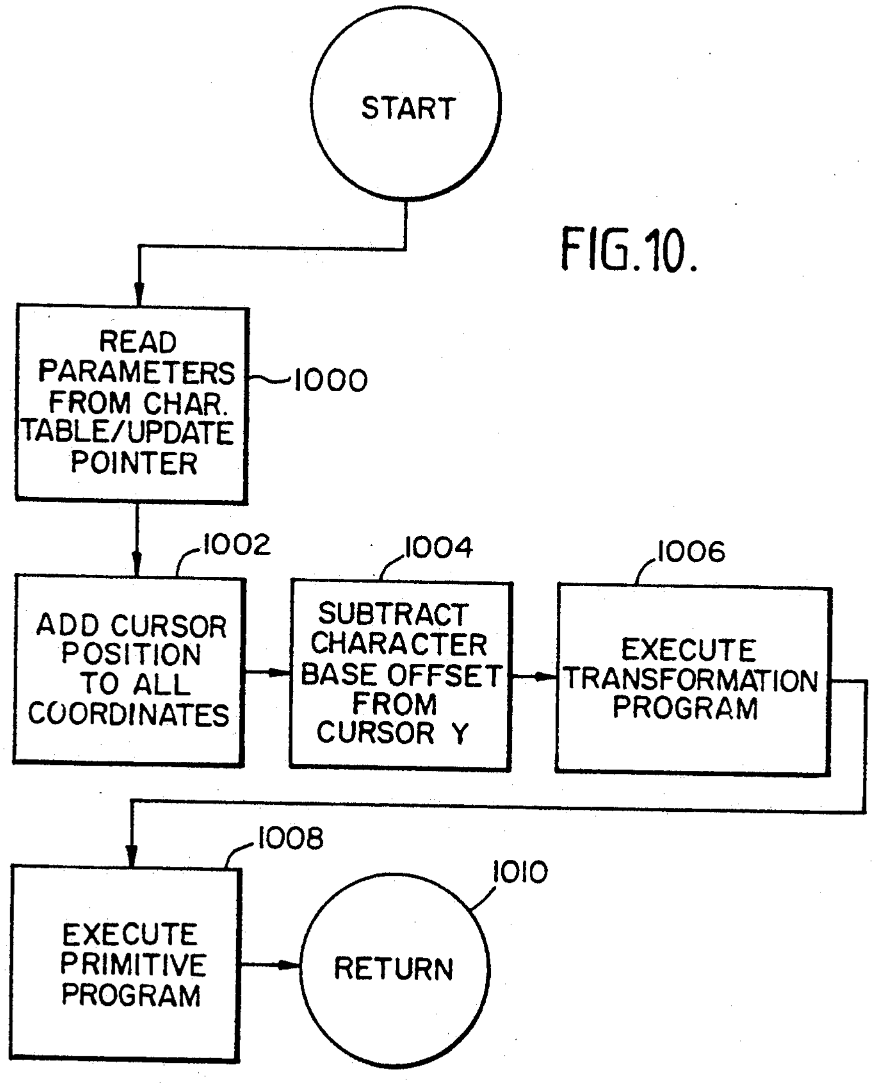
FIG. 10 is a flow chart of a typical Graphical Call Routine.

FIG. 10 shows a flow chart for a typical GPCR. As indicated by block 1000, the GPCR first reads the parameter data from the character table and updates the character table pointer. As has been stated, there is one GPCR for each primitive required. Each GPCR knows exactly how many parameters are necessary to execute a primitive and where to put them.

Next, in block 1002, the GPCR adds the cursor position to all coordinates so that the drawn character will be properly placed (at the specified location) on the screen.

Next, in block 1004, the character base offset 304 is read from the Font Look Up Table 1114 and subtracted from the current cursor Y position so as to give correct alignment for characters descending below the base line. This may be seen more clearly by reference to FIG. 8. The letter "b" is shown within a cell 800 and with its baseline 802. As can be seen, the letter "q" descends below the base line 802 used by the letter "b" (which is also normally used by most characters). For most characters, the current Y cursor position is at the base line. In order to force the cursor to start lower, the Base Offset value from the "q" data structure within the FLUT is subtracted from the current Y cursor position. This will make the bottom of the letter "q" appear below any non offset characters.

Next, in block 1006, the GPCR executes the transformation program. The transformation program gets it data from the Text Transformation Table 118. Alternatively, the GPCR may extract the data from the text transformation table and pass it to the Transformation Program. It is preferred, for economy of coding that the transformation program be executed as a subroutine call.

The Transformation program operates on the primitives parameters, (which are passed to it from the GPCR), and puts the manipulated parameters in a globally accessible area.

Next, in block 1008, the GPCR executes the primitive program for which it was defined (preferably by a subroutine call). As has been stated, the GPCR places the transformed parameters wherever the primitive program expects to or needs to find them (e.g. in a particular location in memory). As can be seen from FIG. 1, the Primitive Programs 126 cause the systems Graphics Controller 102 to draw the primitive on the mapped Display Device 104. The first portion of the Draw Program is then re-entered 1010 (preferably through the use of a return command).

Figure 11:
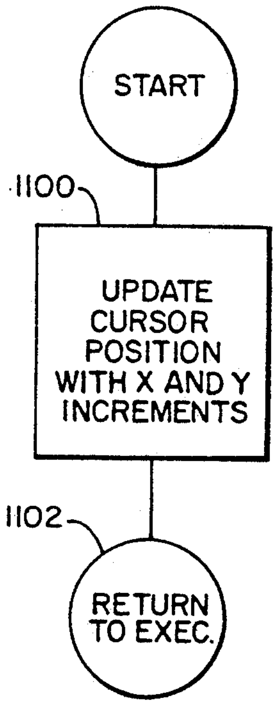
FIG. 11 is a flow chart of an End of Character routine.

The next primitive address is then executed and the cycle repeats itself. The last address in the Character Table 400 (for each character) is for the End of Character Primitive (FIG. 11). When executed, the End of Character Primitive updates the cursor position with the X, Y increment read from entries 1 and 2 in the characters FLUT structure (block 1100) and returns to the Executive. It is important to note that it is the Execution of the End of Character Primitive that terminates the Draw Program and returns control 1102 to the Executive Program 122 whereby the next character may be generated.

In the embodiment described above, the cursor position stored in the Current Font Store Table 112 is a "nominal" cursor position which does not necessarily correspond to the position at which each character is displayed, but instead corresponds to the position where the character would be displayed before the operation of the Transformation program in performing any desired translation, scaling or rotation.

The Text Transformation Table 1118 may be modified between display of each character. For example, if it is desired to rotate each character by 10 degrees about a centre corresponding to the cursor position before display of that character, the centre of rotation provided by the Text Transformation Table may be updated using the current cursor position before the transformation program is executed.

In a development of the transformation operation, rotation or scaling relative to a centre corresponding to the centre of each character may be accomplished. In order to do this, the Font Look Up Table entry for each character is amplified to include data giving the centre position of that character relative to the initial cursor position. Thus, prior to execution of the transformation program, the Text Transformation Table can be updated using the current cursor position and the centre position of the character relative to the cursor position to provide for rotation or scaling of the character about the centre of the character.

As an alternative embodiment, the character table or tables may first be read from a memory on storage device and then placed into Global Memory/Temporary Storage 120 before execution. This would be done where the Character Table is stored in a slower access memory (for example a two dimensional memory) or storage device (for example a floppy) and it is desired to actually execute out of faster memory (such as Static RAM). In this case, rather than storing the End of Character Address 410 at the end of the Character Table 400, the program keeps track of the number of entries in the Character Table and continues to place them into temporary storage until the number of entries copied is equal to the character table length (read from entry 5 in the FLUT's character structure). At that point, the program inserts an END OF CHARACTER address at the end of the character data. Once the LUT information has been loaded into temporary storage, the program begins to read the information from the beginning of temporary store just as described above for the first embodiment.

The present invention is not limited to the drawing of stick figures. By using the other primitives in conjunction with the flood fill primitive characters of any width and color may be drawn. For example to draw the letter "i" the primitive routines for a rectangle and a circle may be used (i.e. the circle drawn over the rectangle). The "flood fill" primitive may then be used to fill in the two shapes drawn by the primitives. The flood fill primitive is rather unique in that it actually looks into the display memory, determines the perimeter of the polygon to be filled and then, starting at a specified point, fills in the polygon with a specified color. It should be understood that two dimensional characters can also be generated through the use of primitives that directly draw filled geometric shapes (e.g. filled rectangle, filled circle).

As can be seen from the foregoing description, the invention actually generates characters on a real time basis rather than simply drawing or printing characters based on pre-stored bit patterns. Many modifications and improvements to the preferred embodiments will now occur to those skilled in the art. For example, the GPCRs may be eliminated and the character table may contain address data directly identifying the graphical primitive programs used to generate the character. Further, the text transformation and/or the base offset modification functions may be eliminated if the programer does not desire to use these features. Moreover, the graphical primitives may be executed by appropriate hardware/firmware or by software. Therefore, while the preferred embodiments have been described, these should not be taken as a limitation of the present invention but only as exemplary thereof.

We claim:

1. A character generating apparatus comprising:

first means for receiving character code data identifying a character in a set of characters:

second means for identifying for each received character code data, at least one graphical primitive, in a set of different graphical primitives representing a plurality of different shapes, for making up the character identified by that character code data, and data indicating the size and disposition of each identified graphical primitive in the character; and third means for generating the identified character from the at least one graphical primitive identified by the primitive identifying data of a size and in a disposition indicated by the size and disposition indicating data.

2. The character generating apparatus of claim 1, further comprising:

fourth means for transforming the size and disposition indicating data in accordance with text transformation data prior to the size and disposition indicating data being provided to said third means.

3. The character generating apparatus of claim 2, further comprising:

fifth means for storing cursor position indicating data; and sixth means for updating the cursor position indicating data after the character has been generated by said third means.

4. The character generating apparatus of claim 3, further comprising:

seventh means for providing the cursor position indicating data to said third means.

5. The character generating apparatus of claim 4, further comprising:

eighth means for modifying the size and disposition indicating data relative to the cursor position indicating data before said size and disposition indicating data is provided to said third means .

6. The character generating apparatus of claim 3, further comprising:

ninth means for allowing the character code data of a next character to be receiving by said first means after a previously identified character has been generated by said third means.

7. A character generating apparatus, comprising:

first means for receiving character code data identifying a character in a set of characters;

second means for identifying, for each received character code data, at least one graphical primitive, in a set of different such graphical primitives representing a plurality of different shapes, for making up the character identified by that character code data;

third means for reading size and disposition data for said at least one graphical primitive in accordance with the character code data;

fourth means for storing cursor position indicating data;

fifth means for modifying the size and disposition data in accordance with said cursor position indicating data; and sixth means for generating said at least one graphical primitive in accordance with the modified size and disposition data.

8. The character generating apparatus of claim 7, further comprising:

seventh means for modifying the cursor position indicating data.

9. The character generating apparatus of claim 8, wherein said seventh means comprises:

means for modifying the cursor position indicating data using a base offset value.

10. The character generating apparatus of claim 7 further comprising:

eighth means for transforming the modified size and disposition data in accordance with text transformation data before the modified size and disposition data is provided to said sixth means.

11. The character generating apparatus of claim 10, wherein said eighth means comprises means for performing two dimensional transformation by matrix multiplication.

12. The character generating apparatus of claim 10, wherein the means for transforming utilizes values contained in a table.

13. The character generating apparatus of claim 7, further comprising:

ninth means for directing said sixth means to generate graphical primitives in succession to form the identified character.

14. The character generating apparatus of claim 13, further comprising:

tenth means for updating said cursor position indicating data in accordance with cursor increment data after the indicated character has been generated.

15. The character generating apparatus of claim 7, wherein said fifth means utilizes values contained in a table.

16. An apparatus for the real time generation of characters using graphical primitives comprising:

graphics processor means;

mapped display device means connected to the graphics processor means;

program memory means;

at least one graphical primitive program for causing the graphics processor means to draw at least one predetermined shape on the mapped display device means; and draw program means residing in the program memory means for executing the at least one graphical primitive program, whereby a character is generated on the mapped display device means.

17. The apparatus of claim 16, further comprising:

executive program means residing in the program memory means for receiving character code data, and for indicating to the draw program a starting address to allow the execution of the at least one graphical primitive program in accordance with the received character code data.

18. The apparatus of claim 16, further comprising:

transformation means for transforming the at least one predetermined shape in accordance with text transformation data, whereby the generated character may be displayed on the mapped display device means in transformed form.

19. The apparatus of claim 18, further comprising:

memory means for storing the text transformation data.

20. A computer-based method of generating characters using graphical primitives for visual display, comprising the steps of:

(1) reading character code data;

(2) executing the graphical primitives necessary to generate a character specified by the character code data; and (3) bit mapping said character onto a display device.

21. The computer-based method of claim 20, further comprising a step between steps (1) and (2) of:

(3) providing the computer with a list of the graphical primitives necessary to generate the character.

22. The computer-based method of claim 21, wherein step (3) comprises the step of transferring to the computer a list of the starting addresses of programs which execute the graphical primitives necessary to generate the character.

23. The computer-based method of claim 22, wherein step (3) further comprises the step of transferring to the computer a list of parameters necessary to execute the graphical primitives.

24. The computer-based method of claim 23, wherein the step of transferring to the computer a list of parameters comprises a step of transferring data indicating the size and disposition of graphical primitives.

25. The computer-based method of claim 24, wherein the step of transferring to the computer a list of parameters comprises a step of transforming said parameters, whereby each graphical primitive is transformed so that the character is correspondingly transformed.

26. The computer-based method of any of claims 20 to 25 wherein step (2) further comprises a step of flood filling at least one graphical primitive with a specified color.

27. The computer character generating system comprising a bit-mapped display, and means coupled to said bit-mapped display for formulating the bit map for each character as the character is displayed.

28. A character generating apparatus comprising:

first means for receiving character code data identifying a character in a set of characters;

second means for identifying, for each received character code data, at least one graphical primitive, in a set of different graphical primitives, for making up the character identified by that character code data, and data indicating the size and disposition of each identified graphical primitive in the character;

third means for generating the character from the at least one graphical primitive identified by the primitive identifying data of a size and in a disposition indicated by the size and disposition indicating data;

fourth means for transforming the size and disposition indicating data in accordance with text transformation data prior to the size and disposition indicating data being provided to said third means;

fifth means for storing cursor position indicating data;

sixth means for updating the cursor position indicating data after the character has been generated by said third means;

seventh means for providing the cursor position indicating data to said third means;

eighth means for modifying the size and disposition indicating data relative to the cursor position indicating data before it is provided to said third means; and ninth means for enabling said first means to receive character data of a next character after a first character has been generated by said third means, wherein said fourth means comprises means for transforming the modified size and disposition indicating data in accordance with two dimensional transformation by matrix multiplication.

29. A character generating apparatus comprising:

means for receiving a character code identifying a character in a set of characters;

table memory means for storing a table providing for said character code a start address of at least one graphical primitive routine to be executed in forming said character identified by said character code, and size and disposition data to be used by said at least one graphical primitive routine;

routine memory means for storing a plurality of said at least one graphical primitive routines beginning at respective start addresses; and control means responsive to receiving said character code and operable to read data originating from said table memory means representing the start address of each said at least one graphical primitive routine for said received character code and to cause execution of said at least one graphical primitive routine that commences at the read start address;

wherein each graphical primitive routine is operable to read size and disposition data originating from the table memory means for said character code and respective graphical primitive routine and to form a graphical primitive of a respective shape and of a size and disposition according to the read size and disposition data.

* * * * *